TRAINABLE DECISION SYSTEM AND ADAPTIVE MEMORY ELEMENT

Filed July 21, 1966 3 Sheets-Sheet 1

INVENTOR.
Robert A. Meadows
Lawrence J. Housey, Jr.
E. Mickey Hubbard
Attorney

INVENTORS
Robert A. Meadows
Lawrence J. Housey, Jr.
E. Mickey Hubbard
Attorney

United States Patent Office 3,400,383

Patented Sept. 3, 1968

3,400,383

TRAINABLE DECISION SYSTEM AND ADAPTIVE MEMORY ELEMENT

Robert A. Meadows and Lawrence J. Housey, Jr., Dallas, Tex., assignors to Texas Instruments Incorporated, Dallas, Tex., a corporation of Delaware Continuation-in-part of application Ser. No. 387,618, Aug. 5, 1964. This application July 21, 1966, Ser. No. 573,141

14 Claims. (Cl. 340—173)

ABSTRACT OF THE DISCLOSURE

This specification discloses an adaptive memory device characterized by a body of semiconductor material having spaced electrical contacts and a film of electret material to induce, in the body between the electrical contacts, a conductive path of a conductance proportional to the degree of residual polarization of the electret material. The electret material exhibits a residual polarization after being subjected to a polarization-enabling energy and to a polarizing field. Means for applying polarization-enabling energy, and means for applying a polarized electric field to the film are described.

This is a continuation-in-part of application Ser. No. 387,618, filed Aug. 5, 1964.

The present invention relates to trainable decision systems which are also know as self-organizing systems, learning machines or adaptive systems, and more particularly, but not by way of limitation, relates to such a system employing an improved adaptive element.

Adaptive decision systems have been extensively explored during the past several years. The most notable systems to date include the Adaline and Madaline systems at Stanford Electronic Laboratory, the Perceptron at Cornell Aeronautical Laboratories, and the Minos I and II at Stanford Research Institute. The heart of these adaptive systems is an adaptive component which produces an analog weight factor dependent upon the system's previous experience and training program. In its simplest form, the adaptive component is merely a resistance. the value of which may be selectively increased or decreased by an analog quantity and the value of which may be read out without materially changing the value of the resistance.

In all trainable decision systems the accuracy with which decisions can be made and the usefulness of the machine increases with the number of adaptive components which are employed. Therefore, the availability of an adaptive element having a low unit cost is an overriding consideration in the design and application of all trainable systems. The adaptive elements heretofore available have in general been too large and too expensive for application in other than an experimental system or other systems requiring only a relatively low number of components. Mechanically variable resistors are, of course, impractical except for basic research work. Electromechanically variable resistors are too large and expensive to be practical. Thermistors have been suggested but have serious drawbacks in terms of value retention period and the type of signals available. Photochromic films have been successfully used for two-layer processing of visual data but do not appear to be adaptable to more complicated topologies and have a short retention period. Simple systems using capacitors as charge integrators are inherently very slow in operation, and when sufficient circuitry is used to speed up operation, the system becomes too complex and expensive. Chemical devices which employ a reversible electrochemical reaction or a reversible electroplating reaction have been used but are too expensive. Various magnetic flux integration devices such as the transpolarizor have been proposed but are also complex and expensive. Thus the available adaptive components are quite cumbersome and expensive and cannot be, as a practical matter, used in a system having a large number of adaptive elements.

The present invention contemplates an improved adaptive system utilizing adaptive elements which may be fabricated using diffused microcircuit techniques in an integrated array. The adaptive elements have resistance values which may be varied by applying a polarization-enabling energy and a polarizing field. More specifically, the adaptive memory device may comprise a body of semiconductor material having spaced electrical contacts, a body of electret material adjacent the body of semiconductor material which exhibits a residual polarization after being subjected to a polarization-enabling energy and a polarizing field. The residual polarization of the electret induces a conductive path through the semiconductor material between the electrical contacts having a conductance proportional to the residual polarization of the electret material.

In one specific embodiment of the invention, the electret material is polarized by irradiating the electret material with radiant energy such as ultra-violet light and applying an electric field across the electret material.

In accordance with another specific embodiment of the invention, the electret material is polarized by heating the electret material while applying a polarizing electric field.

The invention also contemplates a specific embodiment wherein the adaptive memory element is comprised of a body of semiconductor material of one type having a surface into which contact regions of the other type are diffused at spaced points, a film of electret material on the surface extending between the two diffused contact regions, and an electrode film over the electret film which is transparent to the enabling radiation energy such as ultra-violet light for applying a polarizing field.

In a further embodiment of the invention, the polarization-enabling energy is heat produced by dissipating power in the body of semiconductor material. In the preferred form of this embodiment, a pair of spaced concentric ring contacts are formed by diffusing contact regions of one type into a body of semiconductor material of the other type. An annular film of electret material exhibiting the residual polarization properties heretofore mentioned is then deposited on the surface of the semiconductor body between the concentric diffused regions. An electrode is formed on the electret for applying a polarizing electrical field to the electret film. Heat is generated by applying a reverse-bias to the diode junction formed between the inner contact region and the body of semiconductor material within the center of the inner contact region to heat the body of semiconductor material and the electret film deposited thereon.

Therefore, an important object of the present invention is to provide an economical trainable decision system having a large number of adaptive memory elements.

Another object of the present invention is to provide a low cost adaptive memory element for a trainable decision system.

A further object of the present invention is to provide an adaptive memory element which is very small and which can be fabricated using integrated circuit techniques in an array of a large number of such elements.

A further object of the invention is to provide an adaptive memory element having a relatively long memory period.

Another object of this invention is to provide a semiconductor adaptive memory element.

Many additional objects and advantages of this invention will be evident to those skilled in the art from the following detailed description and drawings, wherein.

Figure 1:
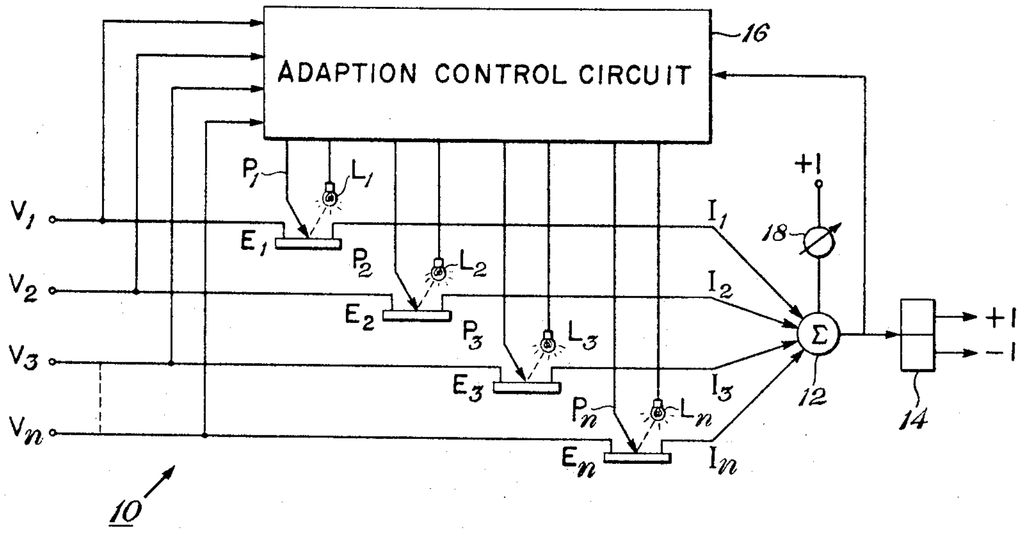
FIGURE 1 is a schematic diagram of a trainable decision system constructed in accordance with the present invention.

Referring now to the drawings, and in particular to FIGURE 1, a trainable decision system constructed in accordance with the present invention is indicated generally by the reference numeral 10. The system 10 is similar to the Adaline system used for research purposes at Stanford University and functions in the same basic manner. The system is sometimes referred to as an adaptive neutron and forms the basic building block for more complex trainable decision systems as is well known in the art.

In the decision system 10, input signals in the form of voltages $V_1$ and $V_n$ are applied to the inputs of adaptive memory elements $E_1$ through $E_n$, respectively, which will hereafter be described in greater detail. The adaptive memory elements $E_1$–$E_n$ have a resistance such that an output signal in the form of currents $I_1$ through $I_n$ are produced which are functions of the respective voltages $V_1$–$V_n$ and the resistance of the respective elements $E_1$–$E_n$. The outputs of the elements $E_1$–$E_n$ are connected to a summing circuit 12 which totals the currents $I_1$–$I_n$ and the current driven through a variable resistor 18 by a constant voltage. The current through the resistor 18 provides a means for adjusting the threshold level as will presently be described. The output from the summing circuit 12 is applied to a threshold circuit 14 and to an adaption control circuit 16 for training the system as will presently be described.

Basically, the adaptive elements $E_1$–$E_n$ exhibit an analog resistance so as to modulate the input voltage signals $V_1$–$V_n$, respectively. The resistance values of the elements $E_1$–$E_n$ may be individually varied by simultaneously applying a polarization-enabling energy and an electric polarizing field to each of the elements. As illustrated in the system 10, the polarization-enabling energy is a radiant energy applied by the sources $L_1$ through $L_n$ in a manner and for the purposes which will hereafter be described in greater detail. The polarizing field may be applied through the leads $P_1$–$P_n$ as will hereafter be described in greater detail. In general, the resistance of each element E varies as the integral of the product of the enabling energy and the polarizing field, and the polarization is reversible. The adaptation control circuit 16 may be manually or electronically implemented to accomplish a wide variety of training procedures as is well known in the art.

The system 10 may be operated in a conventional and well-known manner to classify sets of input data into two or more groups after the system is trained. The system is trained by applying signals $V_1$–$V_n$ representative of an input pattern to the input terminals of the adaptive memory elements $E_1$–$E_n$. The currents $I_1$–$I_n$ through the elements are then summed and compared with one or more threshold levels. The resistance values of the elements $E_1$–$E_n$ are then each varied by a proportionate amount in a direction depending upon the particular training procedure being used so as to produce the threshold level indicative of the correct decision for the particular set of input signals. Succeeding sets of input signals $V_1$–$V_n$, representative of the range of input signal patterns which are to be classified, are applied to the adaptive elements and in each case the resistance values of the elements adjusted until the sum of the output signals is at the correct threshold level. This procedure is repeated until the system correctly classifies each set of input data with a satisfactory degree of accuracy, or until the number of errors made by the system for the sets of data is reduced to a minimum.

After the system is trained as described above, each of the elements will have a particular resistance value. Then a set of unknown data signals $V_1$–$V_n$ is presented to the system which will result in a set of currents $I_1$–$I_n$. If the sum of current values $I_1$–$I_n$ exceeds a particular threshold value, the data falls in one classification, and if it does not exceed the threshold value, the data is in another classification. A number of threshold values may be employed to provide a number of different classifications or decisions, and a number of systems 10 may be combined and logic circuitry employed to result in various majority rule decisions, all of which are known in the art. However, in every case, the number of decisions which can be made, the number of sets of input signals $V_1$–$V_n$ which can be classified, and the accuracy of the system are all dependent upon the number of adaptive memory elements which are employed.

Figure 2:
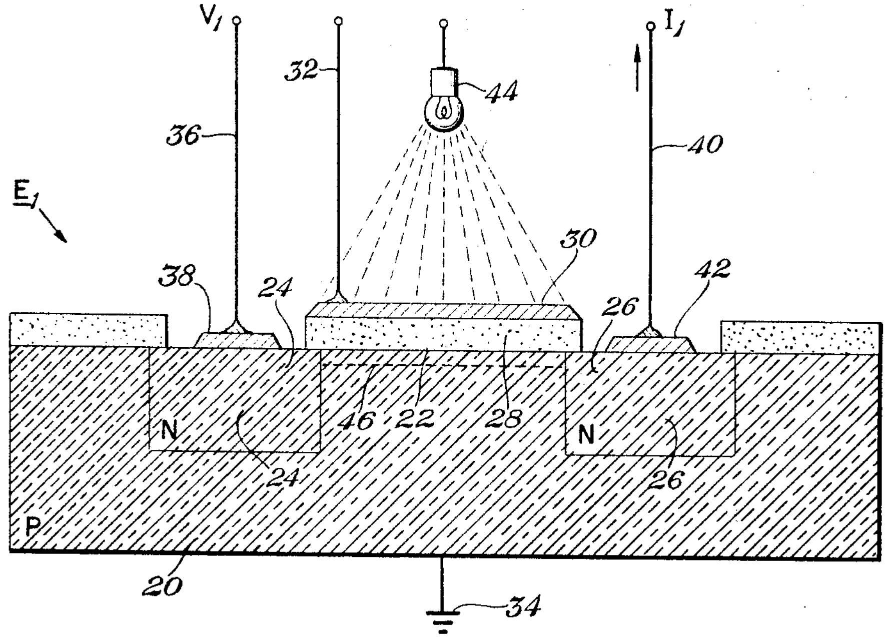
FIGURE 2 is a schematic diagram of an adaptive memory element of the system of FIGURE 1.

The adaptive memory element $E_1$, which is typical of all the elements E, will now be described in greater detail. Referring to FIGURE 2, the element $E_1$ comprises a body of semiconductor material 20 having a surface 22 into which contact regions 24 and 26 of the opposite type have been diffused by conventional techniques. In particular, the body of semiconductor material 20 may comprise P-type silicon crystal substrate into which N-type regions 24 and 26 are diffused. However, it is to be expressly understood that an N-type semiconductor substrate may be used in which case P-type regions would be diffused to form the spaced electrical contacts. An electret material 28 is deposited on the surface 22 and preferably extends between the diffused contact regions 24 and 26. The electret material 28 exhibits a residual polarization resulting from the simultaneous application of a polarization-enabling energy and a polarizing electric field. The polarization-enabling energy may be in the form of radiant energy such as ultra-violet light or may merely be heat, or may be a combination of both. The mechanism by which an electret exhibits the residual polarization properties is not fully known. However, it is believed that the enabling energy excites electrons into the conduction band which are redistributed by the polarizing field. When the enabling energy is removed, the electrons are trapped in the redistributed positions so as to produce a residual polarization which will endure for relatively long periods of from several hours to many days. The residual polarization may be increased or decreased and is reversible so that a relatively wide range of polarization is available. The magnitude of polarization is roughly the integral of the strength of the polarizing field with respect to time, and the rate of change of the polarization is dependent upon the intensity of the enabling energy and the polarizing field. In accordance with the broader aspects of the invention, any electret material having other properties compatible with the system environment and fabrication problems may be used. The list of known electrets, both photoelectrets and thermal electrets, found in "Photoelectrets and the Electrophotographic Process,"

(Russian translation), Copyright 1961 by Consultant's Bureau Enterprises, Inc., 227 W. 17th Street, New York, New York, offers a number of good possibilities, although to date only silicon oxide has been tested.

One important aspect of this invention is the use of silicon oxide as the electret material. Generally it is believed that substantially pure silicon oxide does not exhibit any appreciable degree of residual polarization. However, we have observed that silicon oxide formed by conventional reactive sputtering techniques and in some cases by thermal growth techniques exhibits both photoelectret and thermal electret properties. While the reasons for this phenomenon are not fully understood, it is believed to be due to irregularities in the crystal structure as a result of either the absence of atoms from the lattice or the presence of additional impurity atoms.

In the embodiment illustrated in FIGURE 2, the electret material 28 is a photoelectret material, and is preferably silicon oxide which can be enabled by light radiation in the ultra-violet band, for example. Therefore, a transparent electrode film 30 is deposited over the electret film 28. The electret film 28 may then be subjected to an electric polarizing field by applying a potential to the electrode film 30 with respect to the semiconductor body 20 by means of the lead wire 32. The semiconductor substrate may be connected to ground as represented at 34. An input lead wire 36 may be connected to an input electrode 38 deposited on the surface of the diffused contact region 24, and an output lead wire 40 may be connected to an output electrode 42 deposited on the diffused contact region 26. A light source 44 may be provided for irradiating the electret material 28 through the transparent electrode film 30.

In order to explain the operation of the adaptive memory element $E_1$, assume for the moment that the electret material 28 has no residual polarization and that a positive input voltage $V_1$ is applied from the input lead 36 to the output lead 40 which is connected to the summing circuit 12. In the absence of polarization, the body of semiconductor material 20 between the N-type regions 24 and 26 will exhibit a particular high resistance. Assume now, for example, that it is desired to decrease the resistance value between the leads 36 and 40 during the training cycle of the system 10 ma. positive potential is applied to the electrode film 30 with respect to the body 20 so as to exert a polarizing field on the electret film 28, and the electret film 28 is simultaneously irradiated with light. When the light irradiation and polarizing field are terminated, the electret film 28 will exhibit a residual polarization. The residual polarization of the electret film 28 will then induce a conductive channel in the body of semiconductor material 20 between the contact regions 24 and 26 as represented by the dotted line 46 in the same manner as a conductive channel is produced in a field effect transistor. In other words, the residual polarization produces a sufficient migration of carriers to the surface of the semiconductor body 20 to cause pronounced reduction in the resistance of the path between the contact regions. The resistance of the channel 46 will be proportional to the degree of polarization of the electret material 28 which in turn is related to the magnitude of the electric field, the magnitude of the enabling energy applied to the electret material, and the period of time the two are applied. The degree of polarization is roughly the integral with respect to time of the magnitude of the electric field and the magnitude of the enabling energy. The adaptive process can be reversed and the conductivity of the element reduced by making the electrode 30 negative with respect to the semiconductor body 20 while simultaneously applying enabling energy to the electret material 28.

Figure 3:
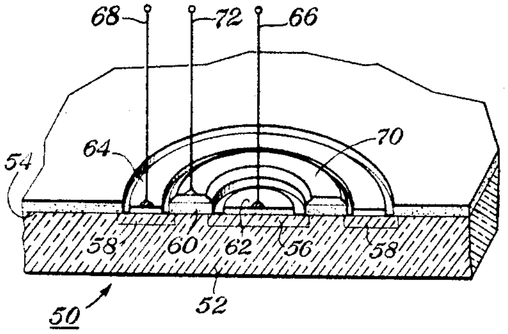
FIGURE 3 is a sectional view, somewhat enlarged and somewhat schematic, of an adaptive memory element constructed in accordance with the present invention.

Referring now to the more detailed drawing of FIGURE 3, an adaptive memory element constructed in accordance with the present invention is indicated generally by the reference numeral 50. The element 50 is similar to the element $E_1$ except that the contact regions are fabricated as concentric rings so as to gain control of all current paths. Thus a body of semiconductor material 52, such as P-type silicon, has a surface 54 into which an annular N-type region 56 and a circular N-type region 58 are diffused. A ring film of electret material 60, such as silicon oxide, extends between and should slightly overlap the contact regions 56 and 58. Electrodes 62 and 64 are in ohmic contact with the N-type regions 56 and 58. An input lead 66 is connected to the electrode 62 and an output lead 68 is connected to the electrode 64. A transparent polarizing electrode 70 is deposited on the electret film 60. A lead 72 is connected to the electrode 70. Thus the annular portion of the P-type semiconductor body 52 disposed between the N-type regions 56 and 58 produces a region of variable conductance as a result of polarization of the electret film 60 as heretofore described, and the operation of the memory element 50 is substantially identical to the element $E_1$ during both the training and readout cycles.

Figure 4A:
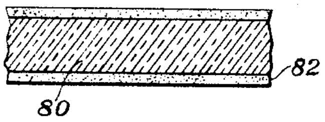
FIGURES 4A–4J are a series of schematic drawings illustrating a process for manufacturing the device of FIGURE 3.
Figure 4B:
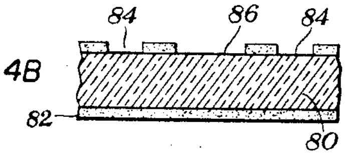
Figure 4C:
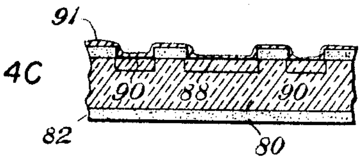
Figure 4D:
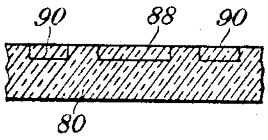
Figure 4E:
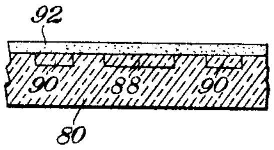
Figure 4F:
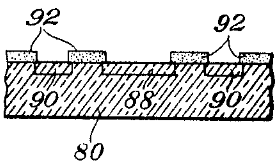
Figure 4G:
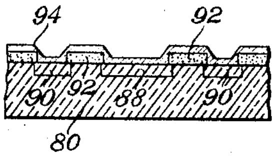
Figure 4H:
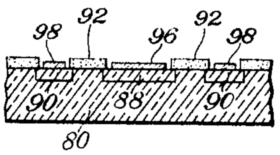
Figures 4I, 4J:
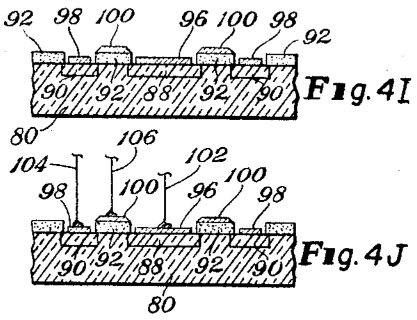

In accordance with an important aspect of the present invention, a large number of the adaptive memory elements may be simultaneously fabricated in an array on a single semiconductor substrate using conventional diffusion techniques. The process for manufacturing the adaptive memory elements by diffusion techniques is illustrated in FIGURES 4A–4J. First a high resistivity P-type silicon substrate 80 having an oxide mask 82 is selectively etched as illustrated in FIGURE 4B so as to expose predetermined portions 84 and 86 of the surface of the substrate. Next the N-type regions 88 and 90 are formed as illustrated in FIGURE 4C by diffusing phosphorus from a glaze 91 through the oxide mask. Next the phosphorus glaze 91 and the silicon oxide mask are removed as illustrated in FIGURE 4D and a silicon oxide film 92 is immediately deposited to produce the necessary electret film as illustrated in FIGURE 4E. Next the electret film 92 is photoetched to gain access to the N-type regions 88 and 90 as illustrated in FIGURE 4F, and a thick aluminum or other conductive film 94 deposited by evaporation, as indicated in FIGURE 4G. The aluminum film is then selectively etched and alloyed to produce the electrodes 96 and 98 as illustrated in FIGURE 4H. Next a thin film of tin oxide 100 is deposited and again selectively photoetched to produce a transparent electrode over the electret film 92. Finally, leads 102, 104 and 106 are ball-bonded to the electrodes 96, 98 and 100, respectively, to complete fabrication of the device. It will be appreciated that electrical contact can be made with the various electrodes by selectively etching vapor-deposited metallic films rather than using ball-bonded leads. This latter procedure may be particularly desirable when fabricating a large array of the elements.

Figure 5:
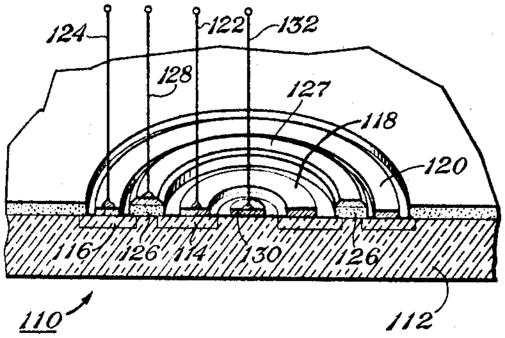
FIGURE 5 is a sectional view similar to FIGURE 3 of another adaptive memory element constructed in accordance with the present invention.

Referring now to FIGURE 5, another adaptive memory element constructed in accordance with the present invention is indicated generally by the reference numeral 110. The memory element 110 is similar to the memory element 50 except that it is constructed such that heat may be used as the enabling energy for the adaptive cycle. More specifically, a substrate of semiconductor material 112, such as P-type silicon, may be provided with spaced, concentric, diffused N-type contact regions 114 and 116. Annular electrodes 118 and 120 are placed in ohmic contact with the contact regions 114 and 116, and leads 122 and 124 are connected to the respective electrodes. A film of electret material 126, such as silicon oxide, is deposited on the surface of the P-type substrate 112 and extends between the contact regions 114 and 116. A third electrode 127 is deposited on the electret 126. A lead 128 is connected to the electrode 127. A fourth electrode 130 is in ohmic contact with the substrate semiconductor material 112 within the inner contact region 114, and a lead 132 is connected to the electrode 130.

The operation of the adaptive memory element 110 is identical to those previously described except for the adapt cycle during which the residual polarization of the electret film is induced. Thus a particular input voltage applied to the input lead 122 will produce a particular current through the conductive path in the substrate 112 between the contact regions 114 and 116 depending upon the resistance of the path as determined by the polarization of the electret film. However, when it is desired to vary the polarization of the electret film 126 so as to vary the resistance of the element, i.e., adapt or train the element, a polarizing potential is applied to the lead 128 and therefore to the electrode 127 having a polarity corresponding to the desired change in polarization. Then a voltage is momentarily applied across the leads 122 and 132 to reverse-bias the diode junction formed between the P-type substrate 112 and the N-type region 114 and pass a pulse of current through the junction. The dissipated power generates heat which rapidly propagates radially outwardly so as to momentarily heat the electret material 126 and thereby enable the electret for adaptation. Since the device is extremely small, the quantity of heat generated is very small. Therefore, after the electret film is quickly heated, the entire device quickly cools to substantially ambient temperature, particularly if the substrate 112 is in the thermal contact with an adequate ambient heat sink. Thus the adaptive element 110 may be placed in an array of a large number of elements, yet each element may be selectively adapted by applying a potential to the polarizing electrode 127 and applying a voltage pulse to reverse-bias the diode junction as described.

Figures 6, 7:
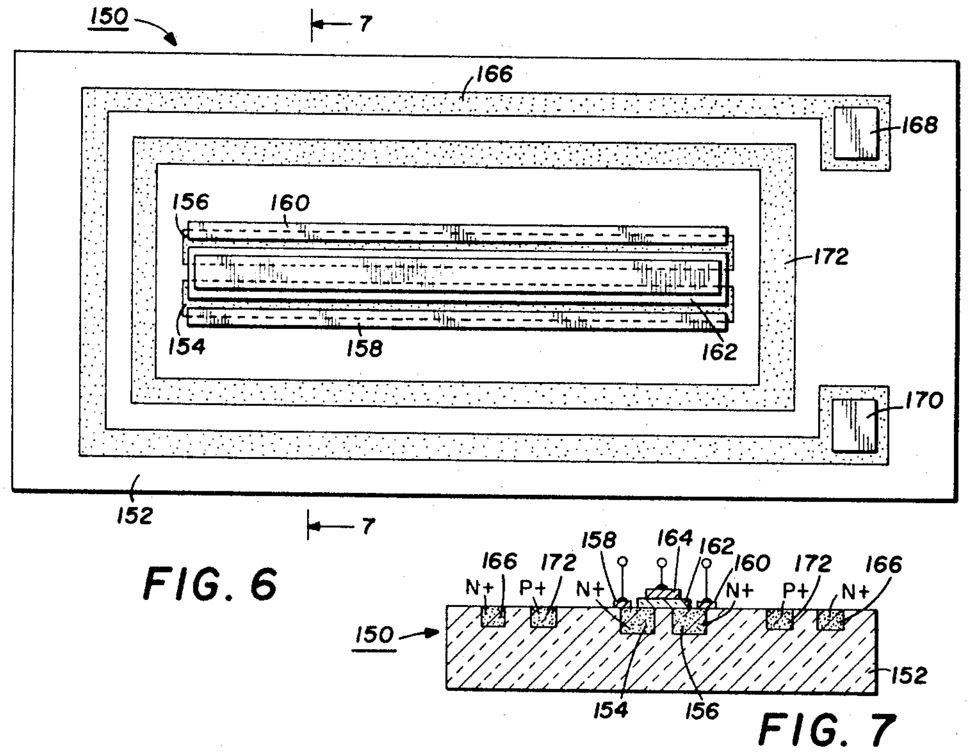
FIGURE 6 is a plan view of another adaptive memory element constructed in accordance with the present invention.
FIGURE 7 is a sectional view taken substantially on lines 7—7 of FIGURE 6.

Another adaptive memory element constructed in accordance with the present invention is indicated generally by the reference numeral 150 in FIGURES 6 and 7. The element 150 is similar to the element 110 in that the enabling energy for the adaptive cycle is heat, but the heat is provided by means of a diffused resistor, rather than a reverse biased diode junction. The device 150 is also symmetrical to facilitate the use of both positive and negative input voltages while maintaining constant adaptive characteristics. The device 150 is comprised of a p-type silicon substrate 152. A pair of N+ diffused regions 154 and 156 form source and drain contact regions, depending upon the polarity of the voltage applied across the two regions. The regions 154 and 156 are of the same size and shape, elongated rectangular areas, and are disposed in parallel relationship. A thermal electret material 162 is disposed over the region between the two diffused regions 154 and 156, and overlaps a portion of the diffused regions. The electret material 162 is typically silicon oxide, but may be any other suitable electret as heretofore described. An N+ resistor diffusion 166 is made around the periphery of the substrate 152 at the same time the diffusions 154 and 156 are made. A P+ isolation ring 172 extends entirely around the diffused regions 154 and 156, and between the diffused regions and the resistor 166. Electrodes 158, 160 and 164 are formed on the diffused regions 154 and 156, and on the electret, respectively, and expanded contacts 168 and 170 formed on the diffused resistor 166, using conventional techniques. The substrate 152 is then mounted using a ceramic foam or other insulating material so that the entire substrate 152 may be more efficiently heated by current passed through the resistor 166.

The operation of the device 150 is identical to the operation of the device 110, except that during the adapt cycle a potential is applied across the electrodes 168 and 170 of the resistor diffusion 166 to heat the substrate 152. The electrodes 158 and 160 are both at a reference potential, such as ground, and a polarizing potential is applied to the gate electrode 164.

Figures 8, 9:
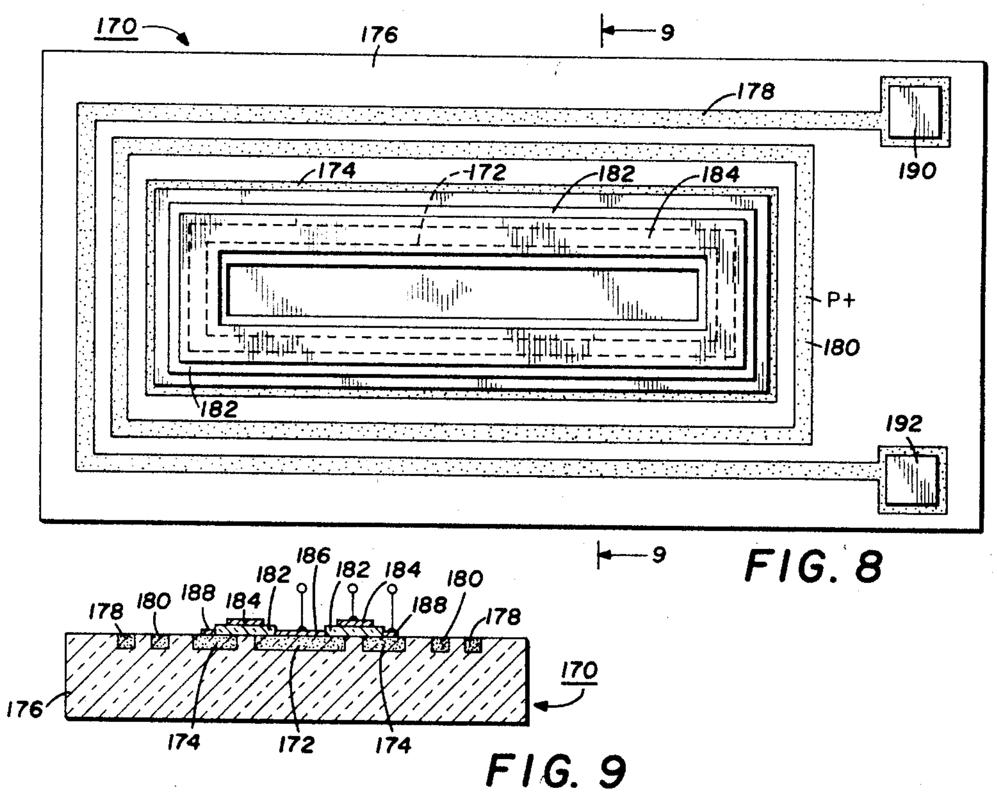
FIGURE 8 is a plan view of still another adaptive memory element constructed in accordance with the present invention.
FIGURE 9 is a sectional view taken substantially on lines 9—9 of FIGURE 8.

Another device constructed in accordance with the present invention is indicated generally by the reference numeral 170 in FIGURES 8 and 9. The device 170 is substantially identical to the device 150 except for the configuration of the diffused contact regions. Thus, the device 170 is formed by making N+ diffusions 172 and 174 in a p-type substrate 176. At the same time, an N+ diffusion 178 is made around the perimeter of the substrate 176 to form a resistor. A P+ isolation diffusion 180 is then made entirely around the region 172 between the resistor 178 and the diffusion 174. A thermal electret material 182 is formed over the space between the diffusions 172 and 174, and an electrode 184 formed on the electret. Electrodes 186 and 188 are deposited on the diffused regions 172 and 174, respectively, so that a voltage of the desired polarity can be applied between the two diffused regions 172 and 174. Expanded contacts 190 and 192 are formed at the ends of the resistor diffusion 178. The operation of the element 170 is substantially identical to the operation of the element 150.

In the above description it has been presumed that the input voltage signals $V_1$–$V_n$ are below the pinch-off voltage of the adaptive elements. If the input voltages are below the pinch-off level, the current through the element will be a function of both the voltage and the resistance of the element so that the input data signals $V_1$–$V_n$ may have analog values. However, if input voltages exceed the pinch-off level, the elements have a constant maximum current without regard to an increase in the input voltage. In this case, the current is dependent only upon the degree of residual polarization. The elements may be operated at the high voltage level in which case the input voltages would be digital values only, i.e., either +1 or −1, or either "on" or "off," rather than an analog value as heretofore described.

From the above detailed description of several preferred embodiments of the invention, it will be evident that a novel trainable decision system has been described which utilizes novel adaptive memory elements. The adaptive memory elements may be fabricated very economically in a large array of microminiaturized elements formed by diffusion techniques on a single semiconductor substrate. This substantially reduces the cost per adaptive element and further reduces the total volume required for the large number of adaptive elements. By using vapor-deposited conductors as leads to the various elements, the entire array may be fabricated in microcircuit form thereby eliminating hand-formed connections. The entire array of memory elements may be enabled simultaneously by a single source of enabling energy such as a light or a heat. A large number of electret materials are suitable for use in the invention, either photoelectret or thermal electret materials. It will also be appreciated that a combination of enabling energies may be employed if preferred.

Although several preferred embodiments of the present invention have been described in detail, it is to be understood that various changes, substitutions and alterations can be made therein without departing from the spirit and scope of the invention.

What is claimed is:

1. An adaptive memory system comprising:
a body of semiconductor material having spaced electrical contacts,
a film of electret material adjacent the body which exhibits a residual polarization after being subjected to a polarization-enabling energy and to a polarizing electric field for inducing a conductive path in the body having a conductance related to the degree of residual polarization of the electret material,
means for applying polarization-enabling energy to the film, and
means for applying a polarized electric field to the film for producing a residual polarization in the film.

2. An adaptive memory system as defined in claim 1 wherein the polarization-enabling energy is a form of radiant energy.

3. An adaptive memory system as defined in claim 1 wherein the polarization-enabling energy is a form of light.

4. An adaptive memory system as defined in claim 1 wherein the polarization-enabling energy is heat.

5. An adaptive memory system comprising:

a body of senmiconductor material of one type having a surface into which spaced electrical contact regions of the other type have been diffused, a film of electret material on the surface and extending substantially between the contacts which exhibits a residual polarization after being subjected to a polarization-enabling energy and a polarizing electric field for inducing a conductive path in the body between the contact regions having a conductance related to the degree of residual polarization of the electret material, an electrode film on the film of electret material, means for applying a polarization-enabling energy to the film of electret material, and means for applying a potential to the electrode film with respect to the body of semiconductor material for producing residual polarization in the film.

6. An adaptive memory system as defined in claim 5 wherein the polarization-enabling energy is radiant energy, and the electrode film transmits the radiant energy.

7. An adaptive memory system as defined in claim 5 wherein the polarization-enabling energy is heat.

8. An adaptive memory system as defined in claim 5 wherein:

the polarization-enabling energy is heat, and the means for applying the heat is comprised of means for passing electrical power through the body of semiconductor material.

9. An adaptive memory system as defined in claim 8 wherein:

the means for applying the heat is comprised of a diode junction formed in the body of semiconductor material, and means for reverse-biasing the diode junction.

10. An adaptive memory system as defined in claim 5 wherein:

the body of semiconductor material is silicon and the film of electret material is silicon oxide.

11. An adaptive memory system as defined in claim 5 wherein:

one of the diffused contact regions is concentrically disposed around the other contact region, the film of electret material is an annular body extending between and overlapping portions of the contact regions, and the polarization-enabling energy is light, and the means for applying a potential to the electret film compirses an annular light transparent electrode formed on the film of electret material.

12. An adaptive memory system as defined in claim 5 wherein:

the diffused contact regions are concentric rings, the film of electret material is an annular body extending between and overlapping portions of the contact regions and the polarization-enabling energy is heat, the means for applying a potential to the film of electret material comprises an annular electrode formed on the film of electret material, and the means for applying polarization-enabling heat to the electret material comprises means for reverse-biasing the diode junction formed between the body of semiconductor material within the inner concentric ring contact region and the inner contact region.

13. An adaptive memory device as defined in claim 1 wherein the electret material is silicon oxide.

14. An adaptive memory device as defined in claim 1 wherein the body of semiconductor material is silicon and the electret material is thermally-grown silicon oxide.

References Cited

UNITED STATES PATENTS

| | | | |
|---|---|---|---|
| 2,791,760 | 5/1957 | Ross | 340—173 |
| 2,935,624 | 5/1960 | Forman | 307—885 |
| 2,980,808 | 4/1961 | Steele. | |
| 3,304,431 | 2/1967 | Biard et al. | |
| 3,316,620 | 5/1967 | Stewart. | |

TERRELL W. FEARS, *Primary Examiner.*